Dec. 31, 1957  A. E. LAEMMEL  2,818,547
IMPEDANCE MEASURING DEVICES
Filed Jan. 11, 1952  4 Sheets-Sheet 1
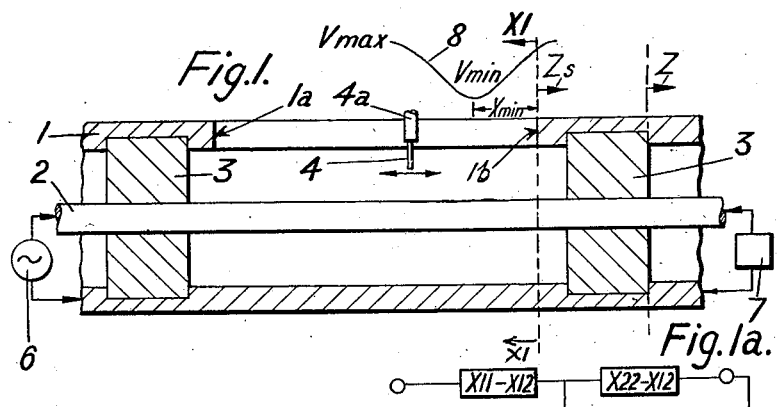
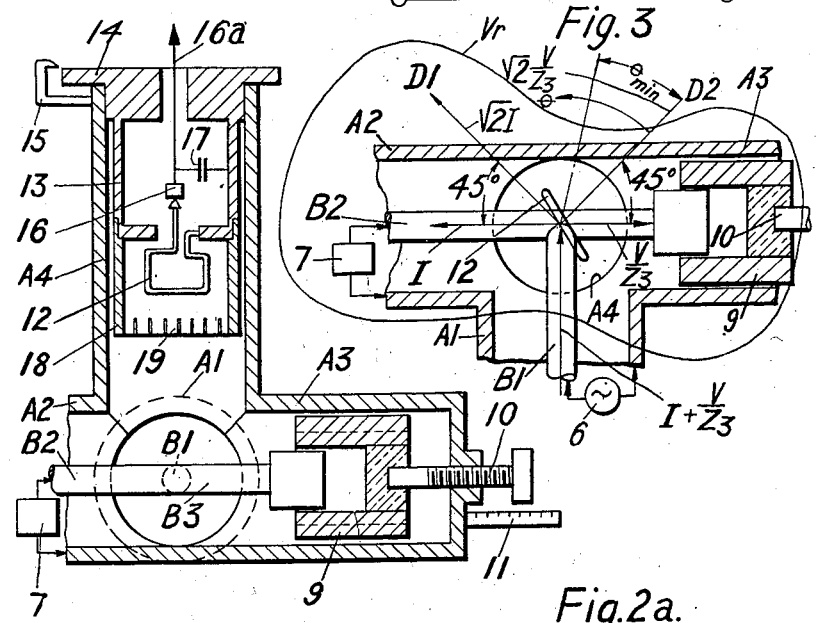
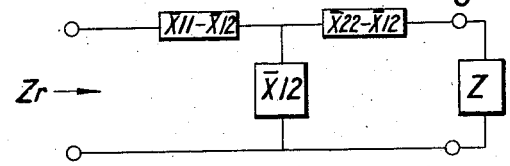
Inventor
Arthur E. Laemmel
By Ralph B. Stewart
Attorney Dec. 31, 1957  A. E. LAEMMEL  2,818,547
IMPEDANCE MEASURING DEVICES
Filed Jan. 11, 1952  4 Sheets-Sheet 2
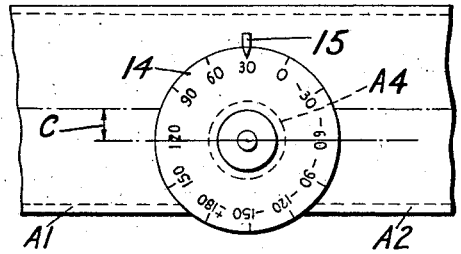
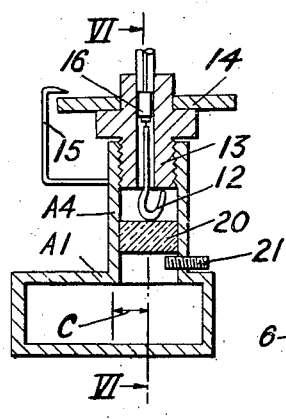
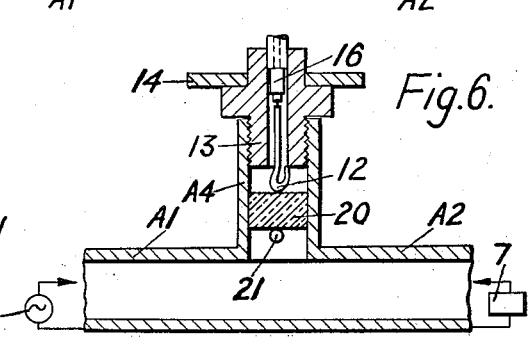
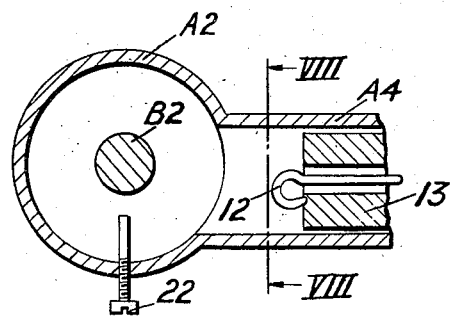
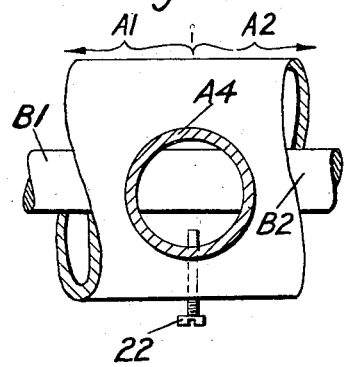
Inventor
Arthur E. Laemmel
By Ralph B. Stewart
Attorney Dec. 31, 1957 A. E. LAEMMEL 2,818,547
IMPEDANCE MEASURING DEVICES
Filed Jan. 11, 1952 4 Sheets-Sheet 3

Inventor
Arthur E. Laemmel
By Ralph B. Stewart
Attorney

Dec. 31, 1957 A. E. LAEMMEL 2,818,547
IMPEDANCE MEASURING DEVICES
Filed Jan. 11, 1952 4 Sheets-Sheet 4

Inventor
Arthur E. Laemmel
By Ralph B. Stewart
Attorney

United States Patent Office 2,818,547
Patented Dec. 31, 1957

2,818,547

IMPEDANCE MEASURING DEVICES

Arthur E. Laemmel, Brooklyn, N. Y., assignor to Polytechnic Institute of Brooklyn, Brooklyn, N. Y., a corporation of New York Application January 11, 1952, Serial No. 265,944

12 Claims. (Cl. 324—58)

This invention relates to devices for the measurement of high frequency impedances over frequency ranges of the order of 100 to 10,000 megacycles per second.

The main object of the invention is to devise an instrument which can be used for the same purposes as the well-known slotted line section, but with certain advantages over the slotted section.

The invention may be incorporated in manual, semiautomatic or automatic impedance meters, and it may be used for measurement of impedances, reflection factors, standing wave ratios or similar characteristics.

In measuring wave guide impedance by the use of the slotted section the usual procedure is to measure two parameters, one the voltage standing wave ratio, hereinafter referred to as VSWR, and the other the position of the standing wave with respect to the load, these two parameters determining the real and imaginary parts of the wave guide impedance. The slotted section uses a probe inserted into the field in the wave guide; by moving the probe along the length of the wave guide the standing wave pattern along the guide may be explored and measured. Systems of this type are subject to numerous errors and other disadvantages which it is the purpose of this invention to avoid.

Briefly, my invention involves a transmission line junction having at least three arms, that is, an input arm connected to a wave source, a load arm connected to an unknown impedance, and a measuring arm or side-arm formed of circular section preferably dimensioned below cut-off, and also including a rotary pick-up for exploring the field within the side-arm. Accordingly, in carrying out the invention, measurements are taken, not in the main guide, but in a circular side-arm, and the devices are so designed as to obtain from the field in the circular side-arm a rotational standing wave pattern corresponding to the standing wave pattern along the main guide. The rotation of a pick-up about the axis of the circular side-arm then corresponds to the translation of a probe in the main guide and a complete turn of the pick-up through 360 degrees gives a set of values corresponding to translation of the probe over a distance equal to a full wavelength in the main guide.

Among the objects of the invention are to provide an improved method of, and apparatus for, measuring simply and indirectly the characteristics of an ultra high frequency standing wave in a waveguide by setting up a corresponding magnetic field in a secondary waveguide below cut-off and measuring the characteristics of the secondary field. Another object is to develop a rotational standing wave pattern in a circular side-arm which will reproduce, sufficiently accurately to permit impedance measurements, the significant characteristics of the standing wave pattern along the main waveguide. Another object is to eliminate the necessity for inserting a pick-up in the waveguide proper in order to measure the waveguide impedance, and to permit the pick-up to be mounted within or coupled to a circular side-arm joined to the main waveguide.

The ultimate object is to design a simple and compact instrument which can be used in a simple manner to get reliable, accurate measurements of the standing wave ratio, reflection coefficient, waveguide impedance and other quantities in the microwave frequency range.

A number of advantages of my side-arm device may be mentioned at this point.

The most apparent advantage of the side-arm impedance meter over a slotted section is that of size. A slotted section should be at least a half wave long at the lowest frequency, and this leads to a very unwieldy piece of apparatus at 100 mc./sec., even for laboratory use. The size of a side-arm impedance meter is not determined by the wavelength, but principally by the mechanical movements required. An allied simplification obtained when the side-arm is used is that the slotted section propagation constant need not be calculated or measured at each frequency; one "wavelength" in the rotational pattern is always one rotation of the loop. Although the side-arm impedance meter can be made more compact than a slotted section, it gives data in a form similar to that of a slotted section, and therefore can be used by a person familiar with slotted section operation. This form of data, in particular the standing wave ratio, is also directly useful in measuring how closely a piece of apparatus is matched to a transmission line.

Another advantage of the side-arm principle over a slotted section is the possibility of designing for high power operation. The sharp probe in the usual slotted section is liable to cause the air to break down because of the locally increased electric field intensity when very high powers are used. A side-arm device could be built in which the junction corners are rounded where the side-arm joins the main line so that the power capacity would be as large as in the uniform line itself (this applies particularly to the waveguide model). Such a device has no moving parts subjected to high powers, and no slot or sliding joints through which power could leak out.

Still another advantage of the side-arm principle is that the rotary motion is more easily accomplished by motor drive than the linear motion of a slotted section, thus facilitating oscillographic presentation of the standing wave pattern.

In certain cases the machining for the rotary movement of the circular side-arm device may be easier than for the linear movement of a slotted section. At low frequencies the long straight motioning required by the slotted section is difficult to obtain accurately, and the inner conductor of the coaxial line is liable to bend or sag. This is especially true at extremely high frequencies where the waveguide dimensions become very small, and the probe and slot must be even smaller. Side-arm impedance meters with pick-up loops would be subject to almost as much difficulty, but the loop can be eliminated, as will be shown later. In general, rotary joints are easier to make accurately than are linear sliding joints.

The invention will be described in more detail in connection with the accompanying drawing.

Figure 1 is a longitudinal sectional view of a conventional slotted line section, and Figure 1a is a diagram of a four-pole network representing the device of Figure 1.

Figure 2 is a sectional view of one form of my circular side-arm impedance measuring device, and Figure 2a is a four-pole diagram, similar to Figure 1a but applying to Figure 2.

Figure 3 is a sectional view similar to Figure 2 but showing the device rotated through 90 degrees about the axis of the unknown arm.

Figures 4, 5 and 6 are plan view, cross section and longitudinal section, respectively, of another form of the invention using a rectangular waveguide having an offcenter circular side-arm dimensioned below cut-off and joined to the broad side of the waveguide.

Figure 7 is a fragmentary sectional view of another form of the invention applied to a transmission line of the coaxial type, and Figure 8 is a sectional view of Figure 7 taken along the line VIII—VIII.

Figure 9:
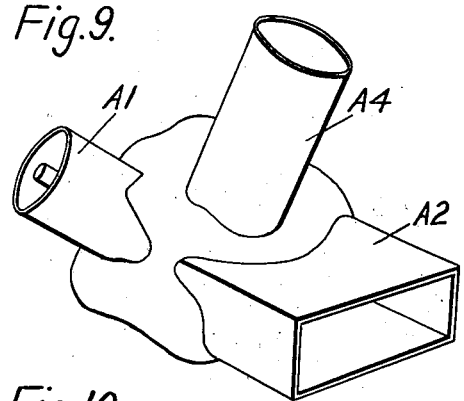
Figure 9 is a generalized showing of the transmission line junction embodying my invention.

Referring to Figure 1, a conventional slotted line section is illustrated in section and comprises a coaxial cable having an outer tubular conductor 1 and an inner conductor 2 supported centrally therein by spaced dielectric beads 3. The outer conductor is provided with a narrow longitudinal slot between the points 1a and 1b for receiving a probe 4 which is mounted to move lengthwise of the slot and is connected by connection 4a to a suitable detector and voltage indicator, not shown. A source of high frequency waves 6 is connected to one end of the cable section and an impedance device 7 is connected to the other end. The device 7 may be of any character and may be formed of a length of transmission line.

It is well known that if the probe 4 is moved along the line without changing its insertion, and the probe is not inserted too deeply into the coaxial line, and is not influenced appreciably by higher modes excited by the end of the slot or the supporting bead or other discontinuities, the voltage picked up by the probe will vary according to the familiar standing wave pattern shown by the curve 8. The voltage will vary along the length of the slot in accordance with the expression:

$$jZ_s \cos kx - \sin kx \quad (1)$$

where $x$ is the distance of the probe from the reference plane XI—XI, $Z_s$ is the normalized impedance terminating the slotted portion of the line, $k$ is the propagation constant of the transmission line in the slotted section, and $j$ is equal to the square root of $-1$.

Figure 1a is a diagram of a four-pole network representing the arrangement of Figure 1 in which the impedance Z across the two output poles represents the output impedance of the slotted section as given in the plane Z in Figure 1, and the impedance $Z_s$ is the impedance appearing at the reference plane XI—XI in Figure 1, and in this case the reference plane is located at the end of the slot shown at 1b. The impedance $Z_s$ is obtained from the formula $$Z_s = (1 - j\rho \tan kx_{\min})/(\rho - j \tan kx_{\min}) \quad (1a)$$

in which $\rho$ is the standing wave ratio (VSWR) obtained by dividing the maximum voltage indication $V_{\max}$ by the minimum voltage indication $V_{\min}$, and $x_{\min}$ is the distance of the probe from the reference plane XI—XI for minimum voltage indication.

For ordinary purposes and with moderate accuracy, the unknown impedance Z may be taken to be $Z_s$. If greater accuracy is required, the effect of certain errors must be taken into consideration. In the slotted section shown, the reasons for $Z_s$ not being the same as Z are the following: the slot changes the characteristic impedance of the coaxial line somewhat, the end of the slot represents a discontinuity, and the bead also causes a discontinuity. All of these effects can be taken into account by noting that the junction between the uniform slotted coaxial line in which the impedance $Z_s$ is measured, and the uniform coaxial line in which Z is located, can be represented quite generally as a four-pole network as shown in Figure 1a. At any particular frequency, such a four-pole can be represented by 6 real numbers; or, if the junction is lossless, by only 3 real numbers. Once these parameters have been measured, Z can be calculated from $Z_s$.

In Figure 2, my invention is shown embodied in a transmission line junction having four arms, three of which are formed of coaxial cables. The input arm A1 is a coaxial line connected to a high frequency source 6. A second coaxial arm A2 is connected to an unknown impedance 7, and a third coaxial arm A3, aligned with arm A2, is connected to a variable condenser. A measuring arm A4 is a waveguide dimensioned below cut-off and arranged at right angles to the other three arms. The inner conductors for the three coaxial arms are shown at B1, B2 and B3, respectively.

The variable condenser embodied in arm A3 is formed of a conductive sleeve 9 mounted for telescoping movement over an enlarged end portion of the center conductor B3. Any suitable arrangement may be used for mounting sleeve 9 for movement axially within the arm A3, such as by mounting the sleeve upon an adjusting screw 10 supported at the end of the arm A3. The position of the sleeve 9 may be indicated by a suitable scale 11 carried by the arm A3 and arranged adjacent the head of the screw 10.

Measuring arm A4 is formed of a circular waveguide dimensioned below cut-off, and a suitable directional pick-up is supported by this arm for exploring the field established in the arm by the other arms of the junction. The directional pick-up may be a pick-up loop 12 mounted at the end of a conductive cylinder 13 positioned within the upper end of the arm A4 and arranged to turn about the axis of the arm. A suitable indicator dial 14 is carried by the cylinder 13 and a stationary index or pointer 15 is arranged adjacent the dial 14. One end of the pick-up loop 12 is grounded to the sleeve 13 and the other end is connected to a suitable detector 16, which may be mounted within the cylinder 13, together with a by-pass condenser 17.

The tubular arm A4 is dimensioned below cut-off for all operating frequencies, and the loop 12 must be positioned sufficiently far from the junction to be influenced predominantly by $H_{11}$ modes, and provision must be made for eliminating the other modes which might still exist at this distance. This may be done by locating the loop 12 at a sufficient distance from the junction so that the higher modes are attenuated more than the desired modes before they reach the loop. The preferred method of eliminating the residual higher modes is by the use of a suitable mode filter interposed between the loop and the junction. Such a filter may be formed of a conductive sleeve 18 surrounding the loop 12 and removably carried by the lower end of the cylinder 13. The lower end of the sleeve 18 is bridged by a plurality of conductive strips 19 arranged in spaced parallel relation and extending across the end of the sleeve in a direction at right-angles to the plane of the loop 12. Detector 16 is connected by a suitable connection 16a to a suitable voltage indicator or other measuring device.

If the pick-up loop receives only $H_{11}$ modes, and the loop is not coupled too tightly to the junction, and is not appreciably influenced by reflections, the field in the circular side arm A4 can be resolved into two mutually perpendicular $H_{11}$ modes. If $\theta$ is an angle describing the annular position of the loop or pick-up about the axis of the side-arm, the voltage induced in the pick-up varies generally in the same manner as in Equation 1, given above for the slotted line section. This will be explained by reference to Figure 3.

Let I and V be the current and voltage respectively at the unknown impedance $Z$. Currents of value $I$, $V/Z_3$ and $I+V/Z_3$, each of which excites the circular side-arm, flow in the three branches of the coaxial T as shown in Figure 3. The side-arm excitations in the direction of $D_1$ and $D_2$ are actually simpler functions of the unknown impedance than the excitations in directions of the $H_{11}$ components, so that the former will be calculated. In the direction $D_1$ the excitation is proportional only to $I$ since the current $V/Z_3$ first has a component in the $D_1$ direction, and next in the opposite direction. Similarly in the direction $D_2$ the electric field is proportional to $V/Z_3$. If the angular position of the pick-up loop in the circular side-arm is denoted by $\theta$, then the pick-up voltage $E\theta$ will vary according to:

$$\frac{V}{Z_3} \cos \theta - I \sin \theta$$

or if $Z_3 = -j$ and $Z_2 = Z_r$, then the rotational voltage pattern will be:

$$I(jZ_r \cos \theta - \sin \theta) \qquad (2)$$

This is the equation of a standing wave pattern of the same general form as in (1) above. The condition $Z_3 = -j$ is satisfied by using a capacity reactance at $Z_3$ of unit value normalized with reference to the line A3.

Another method of using the junction of Figure 2 may in some cases be more desirable. The condition that $Z_3 = -j$ required above is easy to obtain for one frequency, but if the frequency is changed the reactance $Z_3$ must be adjusted so that its value is $-j$ again. If $Z_3$ is real, the operation of the device is altered, on the other hand the resistance now required can be obtained over a wide band without adjustments. The relation between $Z_r$ and $V/I = Z$ (the unknown impedance) now is:

$$Z = -j\frac{Z}{R_3} \qquad (3)$$

The real and imaginary parts of $Z$ are thus interchanged, but the relation becomes independent of frequency. If $R_3 = 1$; and if $Z_r = R_r + jX_r$, and $Z = R + jX$, then (3) becomes:

$$R_r = X \qquad (4)$$
$$X_r = -R$$

As in the case of the slotted line section, the complex impedances in Expression 2 for the side-arm junction can be expressed in terms of easily measurable data as given in the equation $$Z_r = (1 - j\rho \tan \theta_{min})/(\rho - j \tan \theta_{min}) \qquad (4a)$$

where $\theta_{min}$ is the angle of minimum voltage indication from a reference plane and the other terms are the same as given above for the Equation $1a$ of Figure $1a$. The reference plane for the side-arm junction coincides with the direction $D_2$ which bisects the angle between the input line and the load line. In the equations given for Figures $1a$ and $2a$, the subscripts $s$ and $r$ are suggestive of "impedance in the slotted section" and "rotational impedance" respectively.

The rotational impedance $Z_r$ is related to the unknown impedance $Z$ in precisely the same way that $Z_s$ is related to $Z$. The rotational impedance $Z_r$ is the input impedance of a "fictitious four pole" when $Z$ is the corresponding output impedance. This is illustrated in Figure $2a$. The circuit is called a "fictitious" circuit because it does not represent the equivalent circuit of the junction itself or of any part of the junction, but the parameters of the fictitious circuit are functions of the equivalent circuit parameters. The parameters needed to describe the fictitious four pole are again 3 real numbers if the junction is lossless. Once these parameters are measured, $Z$ can be calculated from $Z_r$ by applying elementary network theory. The conditions under which $Z_r$ and $Z$ are related in the above manner are extremely broad: the fictitious four-pole representation is true for any junction between the circular side arm and two co-axial lines or waveguides, one going to the generator and the other to the unknown impedance, with one exception mentioned hereinafter. It is only necessary that the loop does not pick up higher modes and that it is not coupled too tightly to the junction. If it is desired that the fictitious four-pole be nearly matched so that $Z_r$ is substantially equal to $Z$, then the junction cannot be arbitrary but must be designed with certain restrictions. The particular coaxial junction shown in Figure 2 is so designed that adjustments can be made which will let $Z_r = Z$. The variable condenser must be adjusted to give approximately a normalized unit capacitive reactance at the operating frequency. In practice, it is preferable to measure the fictitious four-pole parameters rather than to calculate them. A procedure for making these measurements consists in connecting a series of short-circuited lines of various lengths to the unknown impedance arm, and making a plot of angle of loop for zero pick-up vs. length of short circuit. From this plot not only can the desired parameters be calculated, but the magnitude of the remaining errors can be estimated.

The rotational voltage pattern obtained in the arrangements of Figures 2 and 3 is shown by the curve $V_r$ which is plotted about the axis of the circular side-arm A4 in Figure 3.

In measuring an unknown impedance by the device of Figure 2, the following procedure is used:

At any particular operating frequency the variable condenser 9 is set to produce normalized unit reactance. The particular setting required may be predetermined initially and the dial of the condenser or the scale 11 may be calibrated in terms of the operating frequency, or a simple uniformly graduated dial or scale may be employed in connection with a calibrated frequency chart.

In determining the VSWR of an unknown impedance, the loop is rotated to obtain a minimum reading on the indicator and then a maximum reading, and the standing wave ratio is obtained by dividing the maximum reading by the minimum reading. To obtain the rotational impedance $Z_r$, the loop positions for both minimum and maximum readings are noted with reference to the reference axis and, with the VSWR ratio already determined, the rotational impedance is calculated by the Formula (4a) above. The reference axis bisects the angle between the unknown arm and the input arm. The reference axis also may be determined by short-circuiting the load arm and moving the loop to a position of zero indication. If the frequency of the applied wave is changed, the setting of condenser 9 must also be changed to obtain normalized unit reactance.

In Figures 4, 5 and 6 I have shown a form of my invention in which the circular side-arm is applied to a transmission line junction having only three arms and in which the input and load arms are formed of adjacent aligned sections of a rectangular waveguide. In this arrangement the input and the load arms are indicated at A1 and A2 in conformity with the designations used in Figures 2 and 3. These two arms are in axial alignment between a wave source 6 and an unknown impedance 7, and the circular side-arm A4 is connected at the junction of these two arms through an opening in one of the broad walls of the waveguide, the center of the side arm A4 being displaced from the central plane of the waveguide by the distance $c$, marked in Figures 4 and 5. This displacement of the side-arm from the axes of the other arms is necessary only where the input and load arms are axially aligned.

The side-arm in Figures 4 to 6 is provided with a rotary directional pick-up of the same general form as in Figures 2 and 3, and corresponding elements have been indicated by like reference numerals. A different form of wave filter from that shown in Figure 2 is shown in Figures 5 and 6, but the filter of Figure 2 may be used instead, or the filter of Figure 5 may be used in Figure 2. The filter comprises a filling 20 of solid dielectric material interposed in a section of the side-arm between the junction and the pick-up loop. This material has a dielectric constant sufficient to permit propagation of the $H_{11}$ mode through the filled section of the side-arm, but attenuates all other modes. The filter section can thus be made long enough to reduce the higher modes to any desired intensity without appreciably affecting the $H_{11}$ modes. Where a wider bandwidth is desired, the mode filter may be formed of a series of filled sections with unfilled sections interspersed, thus forming an anisotropic dielectric. In a waveguide filled with an anisotropic dielectric the cut-off wave lengths of the H modes are determined by the transverse dielectric constant and of the E modes by the longitudinal dielectric constant. Since the transverse dielectric constant is greater than the longitudinal dielectric constant, the $H_{21}$ mode has a larger cut-off wave length than the $E_{01}$ mode and the bandwidth is then the ratio between the $H_{11}$ and $H_{21}$ cut-off wave lengths, and is greater than the usable band width of the rectangular waveguide to which it is attached.

Neglecting the very slight disturbance to the main guide due to the presence of the side-arm, the field in the main guide in Figures 4 to 6 will be that of the $H_{10}$ mode. There are two mutually perpendicular independent $H_{11}$ modes in the circular side-arm, both having the same attenuation rate. The smallness of the side-arm compared to the main guide will allow the intensities of the $H_{11}$ modes at the loop to be taken as proportional to $H_x$ and $H_z$ at the mouth of the side-arm. The value of $H_x$ is proportional to the current and $H_z$ to the voltage in the rectangular waveguide. It can be shown mathematically that the two $H_{11}$ modes of the magnetic field vary with the angular displacement about the axis of the side-arm, one varying according to the cosine of the angle and the other according to the sine of the angle. The voltage induced in the loop will be equal to the rate of change of magnetic flux through it. If the loop is small this voltage can be calculated from the fields in the center of the circular waveguide. The voltage induced in the loop as a function of the angle between the normal to the loop and the axis of the rectangular waveguide as the loop is rotated gives the complex rotational voltage standing wave pattern, represented as:

$$jZ_r \cos \theta - \sin \theta \quad (5)$$

which is of the same general form as Expression 1 above for the slotted line section. The impedance $Z_r$ in (5) above is determined in terms of measurable data according to the Formula 4a above. The reference plane from which the $\theta$ angles are measured is the transverse plane of the main waveguide passing through the axis of the side-arm.

The wave pattern represented by the Expression 5 above can be shown to be the standing wave pattern which would be caused by $Z_r$ equal to $Z/A$ where $$A = \frac{2a}{\lambda g} \tan \frac{\pi c}{a} \quad (6)$$

where $a$ is the inside width of the main waveguide and $c$ is the displacement of the side-arm with respect to the central plane of the main guide, where $\lambda g$ is the wave length in the rectangular waveguide, and Z the unknown impedance in the rectangular waveguide. From this expression the distance $c$ by which the side-arm is displaced from the center of the main guide can be obtained by giving A a value of unity.

The amount of offset $c$ is dependent upon the operating frequency, and where it is desired to cover a band of frequencies, the side-arm may be mounted upon a transversely movable section of the wall of the waveguide. Instead of having the point of coupling of the side-arm variable, it may be fixed as shown in the drawing, Figures 4 to 6, and compensation for the frequency dependence may be made by providing an adjustable discontinuity in the lower end of side-arm such as the tuning screw 21 threaded through the wall of the side-arm in the reference plane adjacent the near side wall of the waveguide. By adjusting this screw to different operating frequencies, the frequency dependence error can be substantially eliminated. If more accuracy is desired, the "fictitious" circuit of Figure 2a is also valid here even if $c$ is not the correct value and the circular side-arm is not small.

The offset side-arm device of Figures 4 to 6 may be embodied in a coaxial cable system as shown in Figures 7 and 8. The side-arm A4 is offset with respect to the axis of the main coaxial line as shown. In addition, a probe or antenna 22 projects through the outer conductor of the main cable, in the same transverse plane as the axis of the side-arm and at right-angles to the side-arm. This probe or antenna serves to excite one of the $H_{11}$ modes in the side-arm and the inner conductor of the cable excites the other $H_{11}$ mode. The device of Figures 7 and 8 may be used for obtaining the same measurements as that of Figures 4 to 6.

From the foregoing it will be seen that my circular side-arm principle can be applied to various forms of line junctions, and Figure 9 is a generalized showing of the device. It is not necessary that the various arms be alike; one may be of a coaxial cable, such as the input arm A1, and the output arm A2 may be a waveguide, or vice versa. Also, the angles of arms at the junction are not important, except in the cases already treated in Figures 2 to 8 where the input and output or load arms are aligned in order to make $Z_r$ as nearly equal as possible to Z. In all cases the side-arm A4 is a circular waveguide excited according to the $H_{11}$ mode, or at least to those modes with a single sinusoidal angular variation. The "fictitious" circuit of Figure 2a is also generally valid if the coupling of the loop to the junction is not made so tight as to destroy the $\sin \theta / \cos \theta$ angular dependence.

Figure 10:
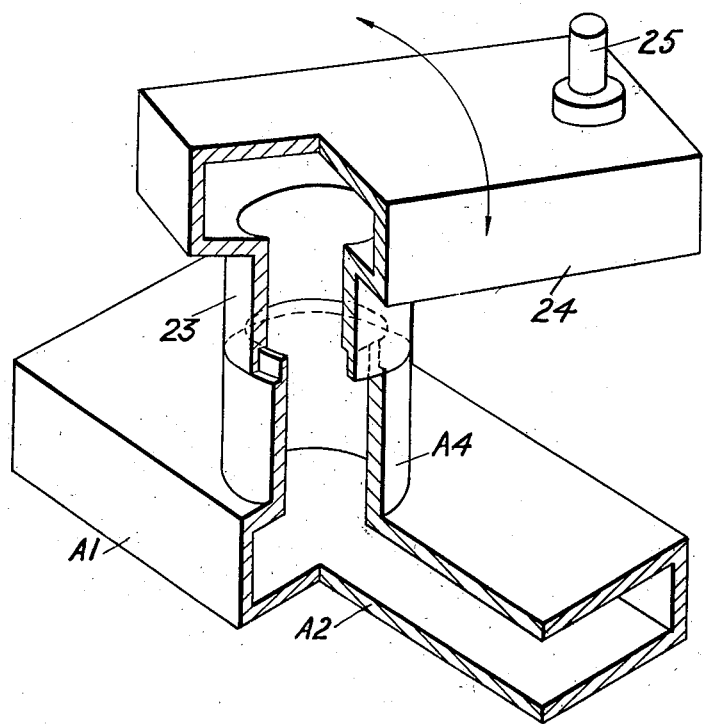
Figure 10 is a perspective view, partly in section, illustrating a form of my invention in which the pick-up loop is eliminated and a directional detector is rotatably coupled with the outer end of the circular side-arm.

The invention is not limited to the use of a loop pick-up of the type already described, but other forms of directional pick-ups may be used for exploring the field in the circular side-arm. Another suitable form of pick-up is shown in Figure 10 in which the side-arm A4 is provided with a rotary section 23 at its upper end which couples the side-arm with a short section of rectangular waveguide 24 extending at right-angles to the side-arm. The section 23 is coupled to waveguide section 24 at a point located centrally of one broad side wall and near one end of section 24. A suitable pick-up element 25, such as a probe, extends into section 24 near the other end and is connected to a suitable detector and voltage indicator.

Figure 11:
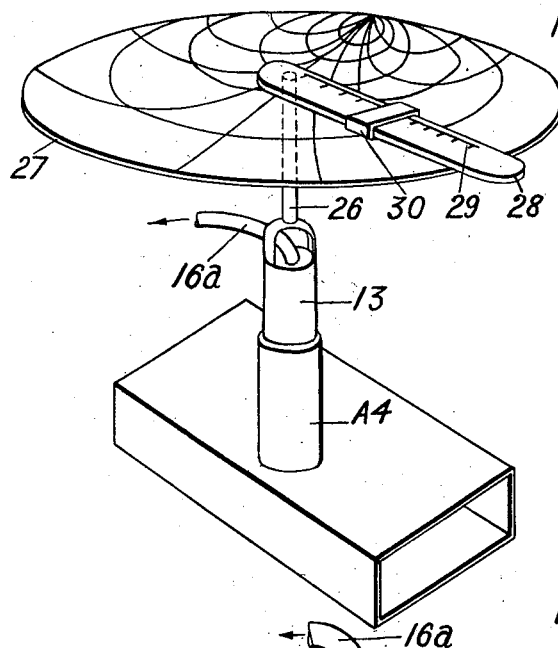
Figure 11 is a perspective view showing an arrangement for associating a Smith chart with the rotary pick-up of the side-arm to facilitate the measurement of impedance.

Figure 11 shows how a Smith chart may be applied to my circular side-arm device to facilitate the making of measurements. While the chart has been applied to the device of Figures 4 to 6, it may be applied to the devices of Figures 2, 7, 9 and 10 as well. The rotary pick-up support 13 is provided with a spindle 26 extending vertically above the side-arm A4. The upper end of spindle 26 extends through the center of a stationary Smith chart 27 and is secured to the inner end of a transparent arm 28 so that the arm rotates with the pick-up. The arm 28 is provided with a VSWR scale along its length and a slider 29 is mounted for manual movement along the arm and bears an index mark or line. The Smith chart 27 bears a series of curved lines representing various factors, such as the resistance and reactance components of the impedance to be measured. For further details of the chart, reference is made to articles published in Electronics for January 1939 and January 1944.

In use of the device of Figure 11, the rotating VSWR is first measured in the normal way and the slider is set to this value of VSWR on the rotating arm. Then the loop is rotated until the voltage picked up is a minimum and the impedance components are read from the Smith chart directly below the slider. This operation is semi-automatic since the adjustments are made by hand and the impedance components are readable directly from the chart. If A is not equal to unity, the indicated impedance must be multiplied by A. More generally, $Z_r$ must be transformed according to the "fictitious" circuit, Figure 2a, unless the latter is matched.

Figure 12:
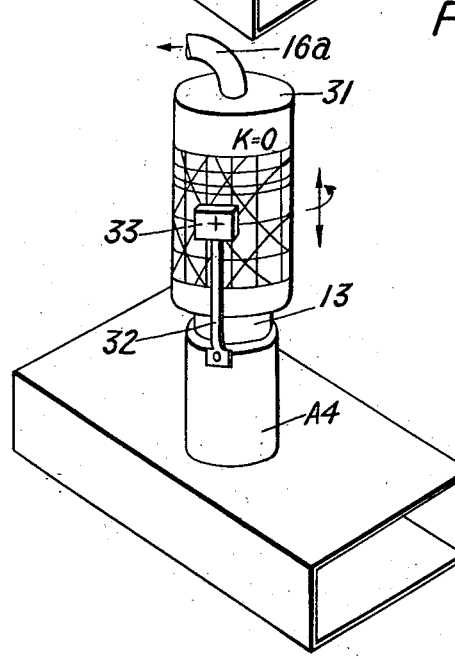
Figure 12 is a perspective view illustrating a modification of my invention in which the rotary pick-up is mounted within the circular side-arm and is arranged for adjustment along the axis of the arm as well as for adjustment about the axis.

Figure 12 shows another arrangement for associating an indicating chart with the movable pick-up element. This arrangement differs from those previously described in that the rotary pick-up support 13 can be moved along its axis as well as being rotatable about its axis. This support is provided with an enlarged cylindrical portion 31 on its upper end for supporting an indicator chart on its cylindrical surface. A stationary indicator arm 32, supported on the side-arm A4, carries a cross-hair 33 in position to cooperate with the chart which carries two sets of coordinate axes. The spaced circles drawn around the cylinder are lines of constant magnitude of the reflection coefficient K, the circle for $K=O$ being shown at the top of the chart. The straight vertical lines are lines of constant phase-angle of K. The other two sets of intersecting curved lines represent the resistance and reactance components respectively of the impedance being measured. These lines generally will not be straight lines or circles, and the particular configuration shown in the drawing is not intended to represent their actual form.

The method of using the device of Figure 12 is as follows: The loop is rotated until the detector reads a minimum and then is moved in or out (without rotation) until the line $K=O$ is under the cross-hair. The loop is now rotated (without axial movement) until a maximum detector reading is obtained and then is withdrawn (without rotary movement) until the detector reading is the same as that previously obtained at the minimum. The desired reflection coefficient and the impedance components now may be read from the chart under the cross-hair. If A is not unity, the indicated impedance must be multiplied by A.

One convenience of the methods of indication of Figures 11 and 12 is that if the main guide impedance is desired at some other reference plane than that for which the device was calibrated, it is merely necessary to rotate either the chart of Figure 11 or the indicator of Figure 12 through an angle just twice the number of electrical degrees through which the reference plane is to be moved. This feature is also useful if the calibration reference planes are to be functions of frequency. It should be remembered here that A has been assumed to be equal to unity.

The standing wave pattern produced by the various forms of my invention may be displayed upon the screen of a cathode-ray tube by arranging to rotate the pick-up at a constant speed, thereby producing an alternating current wave form at the output of the detector, which may be amplified if desired. The output from the pick-up may be brought out through a slip-ring and supplied to the vertical plates of a cathode-ray tube, after amplification if desired. By arranging the rotary pick-up support to operate a sweep-triggering contact on each rotation of the pick-up, the horizontal sweep generator of the cathode-ray tube may be started at a predetermined time in each revolution, with the result that the beam of the cathode-ray tube will trace the standing wave pattern on the screen.

It will be noted that each form of the impedance measuring device disclosed herein embodies a junction of at least three transmission lines of the "enclosed-field" type, and this term is used broadly to apply both to hollow waveguides and to coaxial cables. Also, it will be noted that the two $H_{11}$ mode components produce in the circular side-arm an elliptical polarized stationary wave.

In the case of the rectangular waveguide form, of the type shown in Figures 4 to 6, the circular side-arm will usually have a diameter which is considerably smaller than the longer transverse dimension of the waveguide, and may be smaller than one-half the longer transverse dimension. While it is preferred to dimension the side-arm below cut-off for the purpose of suppressing modes higher than $H_{11}$ modes, these higher modes may be suppressed by the other forms of mode-filters described herein.

I claim:
1. An impedance measuring device comprising a transmission line junction having at least three arms, one of said arms comprising an input arm for supplying high-frequency electromagnetic wave energy to the junction, another arm comprising a load arm for connection to an unknown impedance, and a third arm of said junction comprising a circular waveguide section arranged at right angles to said first and second arms and being coupled at one end to said input and load arms and being dimensioned below cut-off at the operating frequency, a directional pick-up element mounted within said circular waveguide at a location spaced from said junction and being rotatable about the axis of said guide to explore the field set up in said third arm at different angular positions about the axis of said third arm, and mode-filtering means embodied within said circular waveguide section and interposed between said pick-up element and said junction for eliminating all waveguide modes except those which produce an elliptically polarized wave in the section of said waveguide containing said pick-up element.

2. A device according to claim 1 wherein said mode-filtering means comprises solid dielectric material filling a section of said third arm and serving to propagate the $H_{11}$ modes while attenuating all higher modes.

3. An impedance measuring device according to claim 1 wherein said directional pick-up element comprises a pick-up loop positioned within said third arm, and said mode-filtering means comprises a conductive grid arranged transversely of said third arm and being formed of spaced parallel conductors arranged at right angles to the plane of said pick-up loop, said grid being mounted in fixed relation with said loop and being rotatable therewith.

4. A device according to claim 1 wherein said directional pick-up element comprises a section of rectangular waveguide arranged at right-angles to the axis of said circular waveguide, a rotary joint connecting the outer end of said circular waveguide to said rectangular section through a central opening in one broad wall and near one end of said rectangular section, and a voltage pick-up element mounted in the other end portion of said rectangular section.

5. A device for measuring the characteristics of ultra-high frequency apparatus in terms of the characteristics of standing waves set up with said apparatus as a load which comprises a main transmission line including an enclosed-field conductor having a dominant $H_{10}$ mode, a circular side-arm positioned to form a right-angled junction with said enclosed-field conductor and being dimensioned below cut-off at the operating frequency, means for matching said side-arm to said conductor at said junction over a range of operating frequencies, means for suppressing in said circular side-arm wave modes other than the $H_{11}$ mode, a rotary loop, and means for mounting said loop to rotate in said circular side-arm at a location spaced from said main line.

6. An impedance measuring device comprising a section of rectangular waveguide having one transverse dimension longer than the other, a circular waveguide section having one end thereof coupled to said rectangular waveguide through an opening in one broad face thereof, the axis of said coupling opening being displaced laterally with respect to the longitudinal center line of said broad face, a directional pick-up element mounted within said circular waveguide at a location spaced from said junction and being rotatable about the axis of said circular waveguide to explore the field set up in said circular waveguide, and mode-filtering means embodied within said circular waveguide and interposed between said pick-up element and said junction for eliminating all modes except those which produce an elliptical polarized wave at the output end of said circular section.

7. A device according to claim 6 and including an adjustable matching probe extending transversely into said circular waveguide adjacent said rectangular waveguide and at right-angles to the axis of said rectangular waveguide.

8. An impedance measuring device comprising a transmission line junction having at least three arms, one of said arms comprising an input arm for supplying high-frequency electromagnetic energy to the junction, another arm comprising a load arm for connection to an unknown impedance, and a third arm of said junction comprising a circular waveguide section coupled at one end to said junction, a directional pick-up element mounted for rotation about the axis of said circular waveguide and arranged to explore the field in the outer end portion of said waveguide, a pair of indicating members including a two-dimensional chart and a cooperating index, means supporting one of said indicating members in fixed relation with said waveguide, and means mounting the other indicating member for rotary movement with said pick-up element.

9. A device according to claim 8 wherein said indicating members comprise the chart and rotary arm of a Smith chart.

10. An impedance measuring device comprising a transmission line junction having at least three arms, one of said arms comprising an input arm for supplying high-frequency electromagnetic energy to the junction, another arm comprising a load arm for connection to an unknown impedance, and a third arm of said junction comprising a circular waveguide section coupled at one end to said junction and dimensioned so that all modes higher than the dominant $H_{11}$ are cut-off, a directional pick-up element, means mounting said pick-up within said circular waveguide for rotation about the axis of said waveguide and for movement along said axis, a pair of indicating members including a two-dimensional chart and a cooperating index, means supporting one of said indicating members in fixed relation to said circular waveguide, and means mounting the other indicating member for movement with said pick-up element.

11. A device according to claim 10 wherein said indicating chart is supported upon the cylindrical surface of a cylindrical extension of the pick-up support, said chart bearing circular graduations spaced along its axial length and representing different values of reflection coefficient, and parallel-line graduations spaced angularly about the axis of said pick-up and representing angular displacement of the coefficient, and two sets of curved-line graduations intersecting each other at right-angles and representing values of resistance and reactance respectively.

12. A measuring device according to claim 1 and including a fourth arm arranged in axial alignment with said load arm and extending in an opposite direction from said junction, and a variable impedance terminating said fourth arm.

References Cited in the file of this patent

UNITED STATES PATENTS

| | | |
|---|---|---|
| 2,129,712 | Southworth | Sept. 13, 1938 |
| 2,527,979 | Woodward | Oct. 31, 1950 |
| 2,609,422 | Hulstede | Sept. 2, 1952 |
| 2,630,475 | Woodward | Mar. 3, 1953 |
| 2,723,377 | Cohn | Nov. 8, 1955 |

OTHER REFERENCES

"Electronics," article by Smith, January 1939, pp. 29 and 30.

"An automatic standing wave indicator," by Allen, Electrical Engineering, November 1948, p. 1082.

General Radio Experimenter, vol. XXIV, No. 8, January 1950, General Radio Co., Cambridge, Mass, pages 8, 9.